United States Patent [19]

Hichwa et al.

[11] Patent Number: 5,724,175
[45] Date of Patent: Mar. 3, 1998

[54] ELECTROCHROMIC DEVICE MANUFACTURING PROCESS

[75] Inventors: Bryant P. Hichwa; Richard A. Bradley, Jr.; Steven P. Sapers, all of Sonoma; Michael J. Cumbo, Santa Rosa; J. Gordon H. Mathew, Sonoma, all of Calif.

[73] Assignee: Optical Coating Laboratory, Inc., Santa Rosa, Calif.

[21] Appl. No.: 735,431

[22] Filed: Jan. 2, 1997

[51] Int. Cl.$^6$ ........................................ G02F 1/15
[52] U.S. Cl. .................. 359/265; 427/259; 430/319
[58] Field of Search .................. 359/265; 427/259; 430/319

[56] References Cited

U.S. PATENT DOCUMENTS

| | | | |
|---|---|---|---|
| 3,476,029 | 11/1969 | Schreckendgust | 354/227 |
| 4,054,890 | 10/1977 | Shimomura | 354/227 |
| 4,218,120 | 8/1980 | Kawamura et al. | 354/227 |
| 4,244,635 | 1/1981 | Sasaki et al. | 350/336 |
| 4,488,781 | 12/1984 | Giglia | 350/357 |
| 4,852,979 | 8/1989 | Agrawal | 350/357 |

*Primary Examiner*—Frank G. Font
*Assistant Examiner*—Reginald A. Ratiff
*Attorney, Agent, or Firm*—Workman, Nydegger & Seeley

[57] ABSTRACT

The present invention is directed to method for manufacturing electrochromic devices using laser ablation techniques. More specifically, the present invention uses laser ablation to provide a simple, noncontact method of patterning electrochromic devices to a controlled depth, to form an electrochromically active area. Furthermore, laser patterning is conducive to the formation of multiple electrochromic devices on a single substrate.

31 Claims, 7 Drawing Sheets

ELECTROCHROMIC DEVICE MANUFACTURING PROCESS

BACKGROUND OF THE INVENTION

1. The Field of the Invention

The present invention is directed to the manufacture of electrochromic devices. More specifically, the present invention is directed to a process for manufacturing electrochromic devices having precisely patterned electrochromically active areas.

2. The Relevant Technology

Electrochromic materials exhibit a transition, or change in color, in response to an applied voltage. In use, electrochromic materials are typically deposited as a thin film with an electrolyte and an electrical conducting material to form an electrically switchable optical device. A voltage is applied to the electrochromically active materials through the electrical conducting layers creating an electrical field across the electrochromic materials, thereby varying the light transmittance or reflectance through the device. Reversal of the electrical field causes the electrochromic device to return to its original state.

As illustrated in FIG. 1, a typical electrochromic device comprises a supportive substrate 12, having an first electrical conducting layer 14 formed thereon. Layer 16 formed on the electrical conducting layer is either an ion storage layer or an electrochromic layer. An ion conducting layer 18, such as a polymeric electrolyte or an ion conductive thin film, is formed on layer 16. Layer 20, formed on the ion conducting layer, is either an ion storage layer or an electrochromic layer depending on layer 16. For example, if layer 16 is an electrochromic layer, layer 20 is either an ion storage layer or an electrochromic layer. If layer 16 is an ion storage layer, however, layer 20 is an electrochromic layer. A second electrical conducting layer 22 is formed on layer 20. An additional protective barrier may be located on layer 22.

In the manufacture of multi-layer thin film electrochromic devices, provisions must be made for electrical conductivity. It is also important to avoid shorting the electrical conducting layers during fabrication of the electrochromic structure. These objectives are typically met by patterning the electrochromic device during the manufacture of the device.

Patterning of electrochromic devices entails the formation of regions of electrical and/or ionic isolation in the layers of an electrochromic device. Currently, these regions of electrochromic isolation are formed using masking, chemical etching and photolithography techniques during the manufacture of the electrochromic device. For example, U.S. Pat. No. 4,488,781, issued to Giglia, discloses the use of these techniques to form electrochromic display devices. In this process, a glass substrate having a conductive layer thereon is photoetched to form a pattern in the conductive material. An electrochromic material is then deposited through a mask onto the photoetched conductive layer. The electrochromic material is coated with a photoresist material, a mask is placed over the photoresist, and the photoresist is exposed to ultraviolet light to form a pattern. Once developed, this process is repeated for the each of the following layers that are patterned.

Although photolithography, masking, and etching techniques are effective patterning processes, these methods have many drawbacks. For instance, harsh chemicals used in photolithography and chemical etching processes often contaminate and adversely affect the electrochromic device being formed. In addition, photolithography processes are extremely time consuming and tedious. This problem is often compounded when a variety of different geometries are used, such as with sunglasses, where new sets of masks must be fabricated and registered for each different lens geometry.

Still further, physical manipulation and contact inherent in the use of conventional patterning techniques often damages or destroys the electrochromic device being manufactured. Electrochromic devices are inherently fragile, delicate structures. Mechanical contact on the electrochromic device, or chemical contamination of the electrochromic device during standard patterning techniques greatly increases the probability of damaging or destroying the integrity of the device.

Other methods of patterning electrochromically active devices are known, such as laser scribing, laser cutting, sand blasting, punching, and stamping. These processes have, however, been subject to some of the same high labor and contact intensive drawbacks as the processes described above.

From the foregoing, it is readily apparent that there is a need for a simple process for manufacturing electrochromic devices that avoids the use of harsh chemicals. Furthermore, it is clear that there is a need for a noncontact, precise process of patterning electrochromic devices that is conducive to the continuous production of electrochromic devices.

SUMMARY AND OBJECTS OF THE INVENTION

It is, therefore, an object of the present invention to provide improved methods of manufacturing electrochromic devices.

It is another object of the present invention to provide methods for manufacturing electrochromic devices that are not labor intensive.

It is also an object of the present invention to provide improved processes for patterning electrochromic devices.

It is a further object of the present invention to provide simple noncontact processes for patterning electrochromic devices.

Still further, it is an object of the present invention to provide methods for patterning electrochromic devices so as to avoid the use of harsh chemical reagents.

Moreover, it is an object of the present invention to provide high precision depth control and resolution to allow layer specific patterning of the electrochromic device.

To achieve the foregoing objects, and in accordance with the invention as embodied and broadly described herein, the present invention is directed to methods for manufacturing electrochromic devices using laser patterning techniques.

In a preferred embodiment of the present invention, a first electrical conducting layer is formed on a substrate. A region of electrical isolation is formed in the first electrical conducting layer partitioning the electrical conducting layer into at least two electrically separate areas. Once a pattern has been formed in the first electrical conducting layer, an electrochromic layer, an ion conducting layer, an ion storage layer and a second electrical conducting layer are deposited on the first electrical conducting layer in one vacuum using physical vapor deposition. A second region of isolation is then formed in the electrochromic device by laser ablation, separating the electrical conducting layer, the ion storage layer, the ion conducting layer, and the electrochromic layer into at least two electrically and ionically separate areas. The electrochromic device is patterned in such a manner that the first region of electrical separation and the second region of isolation intersect to define at least one electrochromically active area. The precise nature of laser patterning allows the second region of isolation to be formed to a specific, predetermined depth without extending into the first electrical conducting layer.

An advantage of the present invention is that the precision control provided by laser patterning techniques allows each of the layers above the first electrical conducting layer to be formed by physical vapor deposition in one vacuum without breaking the vacuum and thereafter patterned to form a second region of isolation.

Furthermore, in accord with the present invention, and contrary to conventional knowledge, it has been discovered that by using laser patterning techniques, multiple electrochromic devices can be formed on a single substrate and thereafter separated into individual electrochromic devices.

These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to a specific embodiment thereof which is illustrated in the appended drawings. Understanding that these drawing depict only a typical embodiment of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The present invention is directed to the manufacture of electrochromic devices using laser ablation techniques to precisely pattern an electrochromically active area. Electrochromically active areas as used herein are defined as the area of an electrochromic device that changes transmittance or reflectance in response to an applied voltage.

Traditionally, electrochromic devices have been patterned using photolithography, chemical etching and masking techniques. These methods, however, are labor intensive typically requiring a masking, photoresist and photoresist removal for each layer to be patterned. In addition to being tedious and time consuming, these steps involve the use of harsh chemicals that can contaminate or destroy the layers of the electrochromic device. Furthermore, traditional patterning techniques are contact intensive, often damaging or destroying the inherently fragile electrochromic devices.

Although other methods of patterning electrochromic devices, such as sand blasting, laser scribing, laser cutting, punching or stamping are known, these methods have heretofore exhibited the same labor and contact intensive drawbacks as photolithography, etching and masking techniques.

It is a feature the present invention to provide a simple, noncontact process for patterning electrochromic devices that does not use harmful chemicals. More specifically, it is a feature of the present invention to provide a precise process for patterning electrochromic devices using laser patterning techniques.

Figure 1:
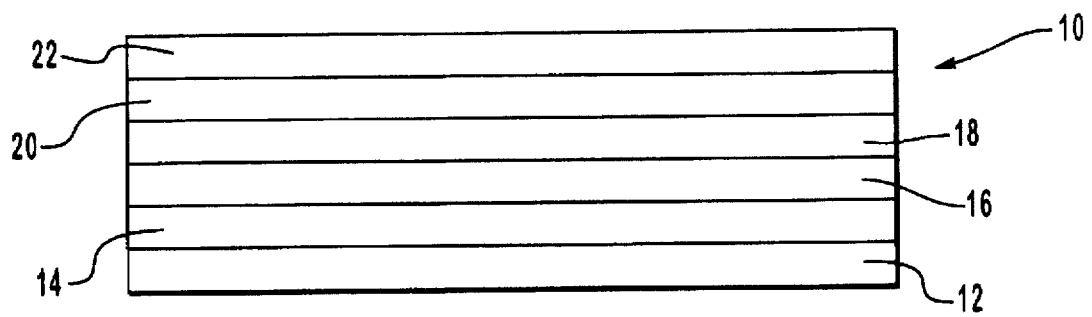
FIG. 1 illustrates a cross-sectional view of a prior art electrochromic device.
Figure 2:
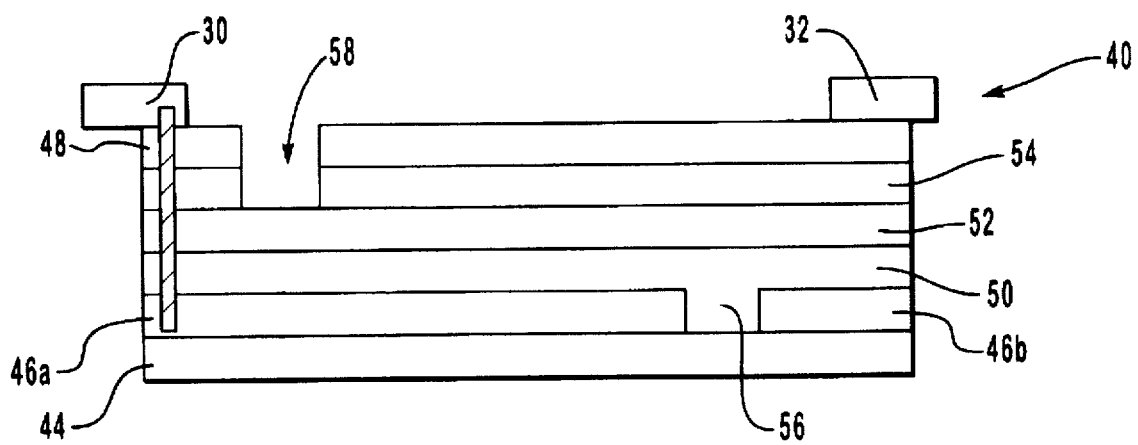
FIG. 2 illustrates a cross-sectional view of an electrochromic device having first and second regions of electrical isolation formed therein.
Figure 3A:
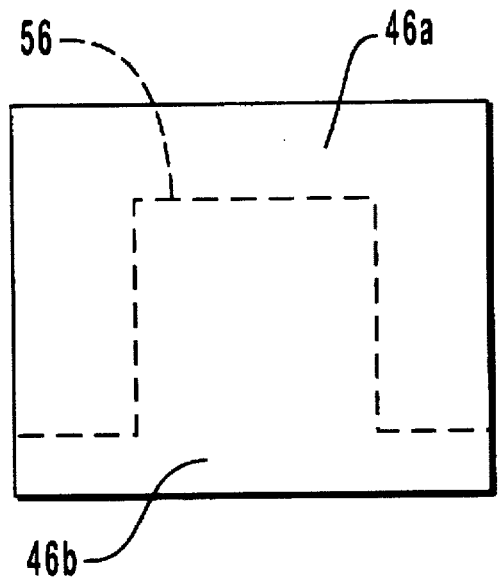
FIG. 3a is a top view of a first region of electrical isolation formed in the first electrical conducting layer, partitioning the first electrical conducting layer into two electrically separate regions.
Figure 3B:
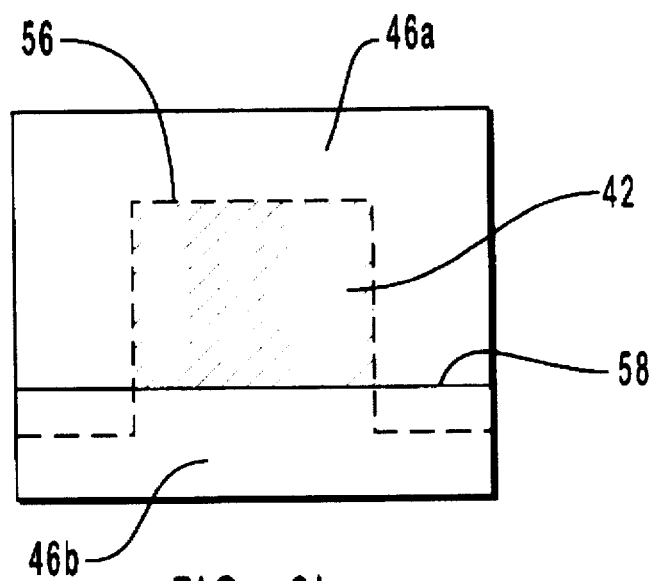
FIG. 3b illustrates a top view of an electrochromic device having a first region of electrical isolation partitioning the first electrical conducting layer into two electrically separate regions, having an ionic storage layer, an ion conducting layer, an electrochromic layer, and a second electrical conducting layer formed thereon; wherein said first region of electrical isolation and the second area of isolation intersect to form an electrochromically active area.

Referring now to the drawings, FIGS. 2 and 3b illustrate an electrochromic device 40, having a pattern formed therein defining an electrochromically active area 42. Electrochromic device 40 comprises a first electrical conductive layer 46 on substrate 44 and second electrical conducting layer 48 at the opposite end of the electrochromic device. The two electrical conducting layers allow a voltage to be applied across the electrochromic materials.

Sandwiched between the electrical conducting layers are an electrochromic layer, an ion conducting layer and an ion storage layer (hereinafter also referred to collectively as an electrochromic stack). Layers 50 and 54 of the electrochromic stack, being interchangeable, are selected from the group consisting of an electrochromic layer and an ion storage layer. In one embodiment of the present invention, one of layers 50 and 54 is an ion storage layer while the other layer is an electrochromic layer. In another embodiment, rather than using an electrochromic layer and an ion storage layer, two electrochromic layers can be used, one of which colors upon reduction and one of which colors upon oxidation. This configuration of the two electrochromic layers will cause both electrodes to become clear or colored simultaneously in response to an appropriate voltage. Hence, layers 50 and 54 can both be electrochromic layers, however, if either layer 50 or 54 is an ion storage layer, the other layer is an electrochromic layer. U.S. Pat. No. 5,080,471, issued to Cogan et al., herein incorporated by reference, discloses the use of two electrochromic layers in an electrochromic device. To complete the electrochromic stack, ion conducting layer 52 is located between layers 50 and 54.

As shown in FIGS. 2 and 3b, in a preferred embodiment of the present invention, the order of the layers comprising the electrochromic device are as follows: substrate 44, first electrical conducting layer 46, ion storage layer 50, ion conducting layer 52, electrochromic layer 54, and second electrical conducting layer 48.

To complete the electrochromic device, regions of electrical isolation 56 and 58 are formed in the electrical conducting layers 46 and 48 using laser ablation to form an electrochromically active area 42. A voltage is applied across the electrochromic device by voltage means 30 and 32. Voltage means 30 and 32 can be any means of applying voltage across the electrochromic device, such as voltage contacts which include, but are not limited to conductive tape, solder, silver paint or carbon paint. In a preferred embodiment as shown in FIG. 2, contact pad 30 is formed to provide an electrical contact through layers 50, 52 and 54 to the lower conducting layer 46a. Electrical contact through numerous layers such as shown in FIG. 2, can be accomplished by direct soldering of the pad to the thin film layers. In addition, FIGS. 4d–4g illustrates the use of conductive tape 34 such as foil with an edge mask so that voltage may be applied to layer 46a Now referring to FIGS. 3a–3b and 4a–4g, an electrochromic device in accordance with the present invention is manufactured by forming a first electrical conducting layer 46 on a support substrate 44. Electrical conducting layer 46 can be formed onto the substrate by any suitable means known in the art and is preferably a glass substrate precoated with an electrical conducting layer material such as indium tin oxide. It is readily apparent to one of ordinary skill that the substrate can be any suitable material, such as glass or plastic.

Although the first electrical conducting layer can be patterned by any method known in the art, a laser is preferably used to pattern a first region of electrical isolation 56 partitioning the electrical conducting layer into at least two electrically separate regions 46a and 46b. In one embodiment of the present invention, the first electrical conducting layer 46 can be patterned in vacuo using laser patterning techniques. Using this method allows the deposition of the entire electrochromic device in a single vacuum cycle.

Layers 50, 52 and 54, are formed on the first electrical conducting layer 46. As discussed above, layer 50 is either an electrochromic layer or an ion storage layer, layer 52 is an ion conducting layer and layer 54 is either an electrochromic layer or an ion storage layer. Layers 50 and 54 can both be electrochromic layers where they act in concert as described above.

A second electrical conducting layer 48 is formed on layer 54 so that a voltage can be applied across the electrochromic stack. Although layers 50, 52, 54 and 48 can be formed by any suitable technique known in the art, including but not limited to sputtering, sintering, evaporation, spreading, or other similar techniques, the electrochromic stack and the second electrical conducting layer are preferably formed using physical or chemical vapor deposition techniques.

Once all layers of the electrochromic device have been deposited, a second region of electrical isolation 58 is formed using laser ablation. As illustrated in FIG. 4d, the second region of isolation 58 formed by laser ablation extends at least through electrical conducting layer 48. In a preferred embodiment of the present invention, the second region of isolation extends into layers 54 through 50, but not through first electrical conducting layer 46 as shown in FIG. 4g. Nevertheless, in accordance with the present invention, the second region of isolation can extend to any point down to first electrical conducting layer 46.

It is readily understood by one of skill in the art in view of the teachings herein, that when the second region of isolation extends only through second electrical conducting layer 48, a region of electrical isolation is formed. Likewise, when second region 58 of isolation is formed by laser ablation extends through the electrical conducting layer 48 and into the electrochromic layer, ion conducting layer, or ion storage layer, the pattern also acts as a region of ionic isolation. Hence, when second region of isolation 58 extends into the electrochromic stack a region of electrical and ionic separation is formed.

In a preferred embodiment of the present invention, the second region of isolation extends through second electrical conducting layer 48 into the electrochromic stack, i.e. layers 54, 52, and 50, to form a region of electrical and ionic separation as illustrated in FIGS. 4d through 4g. By extending the second region of isolation into the electrochromic stack, them is no migration of ions into the electrochromically active area that can cause blurring or contamination of the electrochromically active area. Thus, extending the second region of isolation into the electrochromic stack ensures the distinctiveness of the boundary of the electrochromically active area.

As illustrated in FIG. 3b, the first region of electrical isolation and the second region of isolation intersect to form a pattern that defines at least one electrochromically active area 42. Depending on the patterning of the first and second regions of isolation, the electrochromically active area can be any shape or geometry desired.

Laser patterning provides a noncontact, intrinsically fast method of delineating regions of isolation in electrochromic devices. Laser patterning techniques further provide a clean, precise method of forming distinct areas of electrochromic activity. In accordance with the present invention, laser delineations in electrochromic devices are prepared by irradiating specific areas of the electrochromic device with laser pulses (also hereinafter referred to as "shots").

A significant advantage of laser ablation patterning is its ability to delineate areas of the electrochromic device to a precisely controlled depth. The lack of control associated with traditional patterning techniques has heretofore prohibited delineation of the electrochromic device to specific depths. The precise nature of laser ablation, however, allows the second region of isolation to be formed to any desired depth after all layers of the electrochromic device have been deposited, without cutting into, or through, first electrical conducting layer 46. It is, therefore, a novel feature of the present invention to deposit the electrochromic stack and the second electrical conducting layer in one vacuum chamber, without breaking the vacuum, and subsequently form a second region of electrical isolation using laser ablation techniques.

The wavelength of the laser pulse used depends on the materials to be delineated and the depth of delineation desired. The laser typically used has a wavelength in the range between 100 nm and 400 nm, and, in use, is focused to a desired energy density. It is noted that the size of the delineation is controlled by varying the size of the laser beam. It is readily understood that the laser used in the ablation patterning process can be programmed to strike a specific area of the electrochromic device so as to delineate any desired pattern.

The radiation used in the laser ablation process can be produced by any suitable laser which is strongly absorbed by the layers to be patterned and which allows for cutting to a controlled depth. Typically, the energy density of in the laser beam should be greater than 1 millijoule/cm$^2$. In a preferred embodiment of the present invention, the laser is an ultraviolet eximer laser, such as XeCl (308 nm), KrF (248 nm) or ArF (193 nm). Other suitable lasers that may be used include, but are not limited to: gas, chemical, and solid state lasers.

Furthermore, it is a surprising feature of the present invention to be able to form a manufacturing construct having a plurality of electrochromically active areas arranged on a single substrate. The plurality of electrochromically active areas can then separated into a plurality of individual electrochromic devices. Alternatively, the plurality of electrochromically active areas can be individually addressed by voltage means, yet remain on their common substrate.

Figure 5:
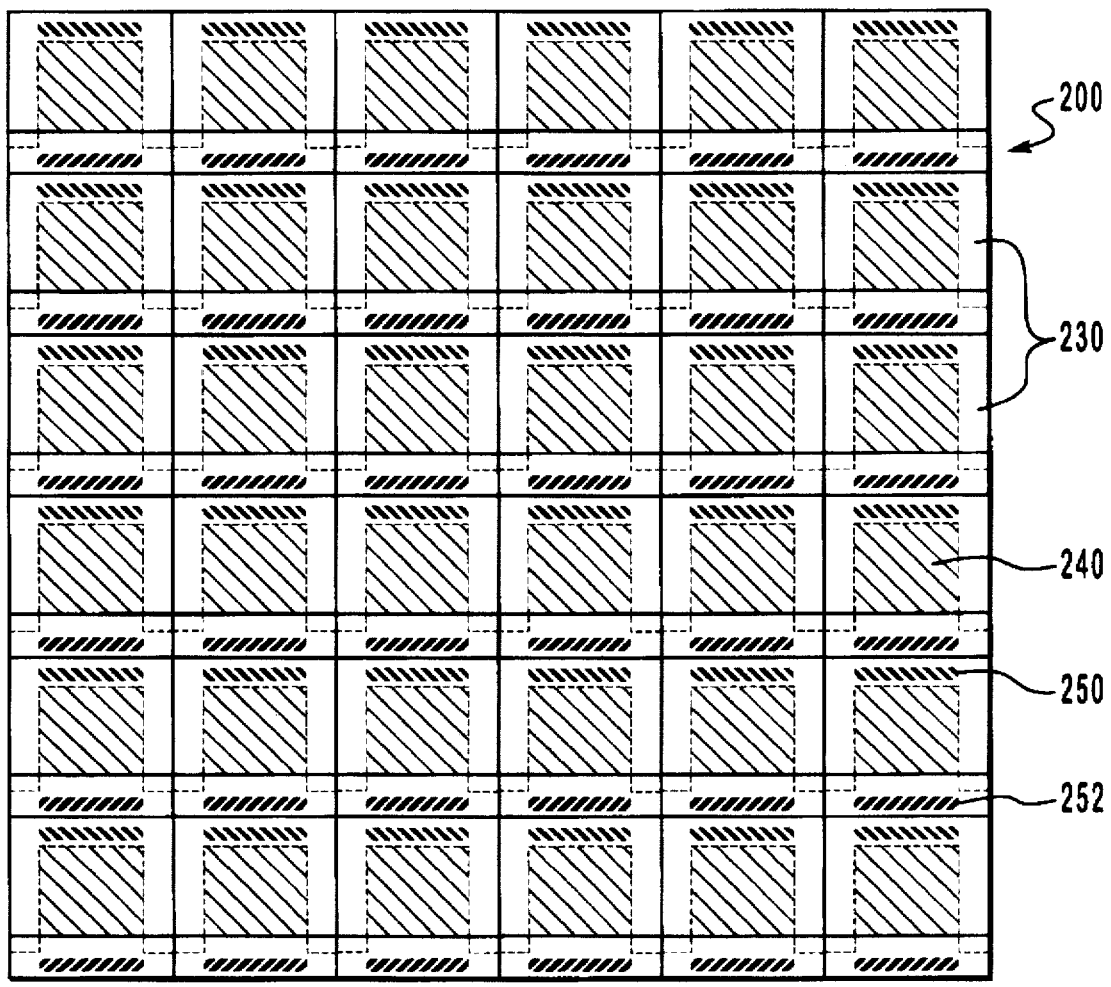
FIG. 5 illustrates a top view of a manufacturing construct 200 having a plurality of electrochromic devices arranged on a single substrate.
Figure 6:
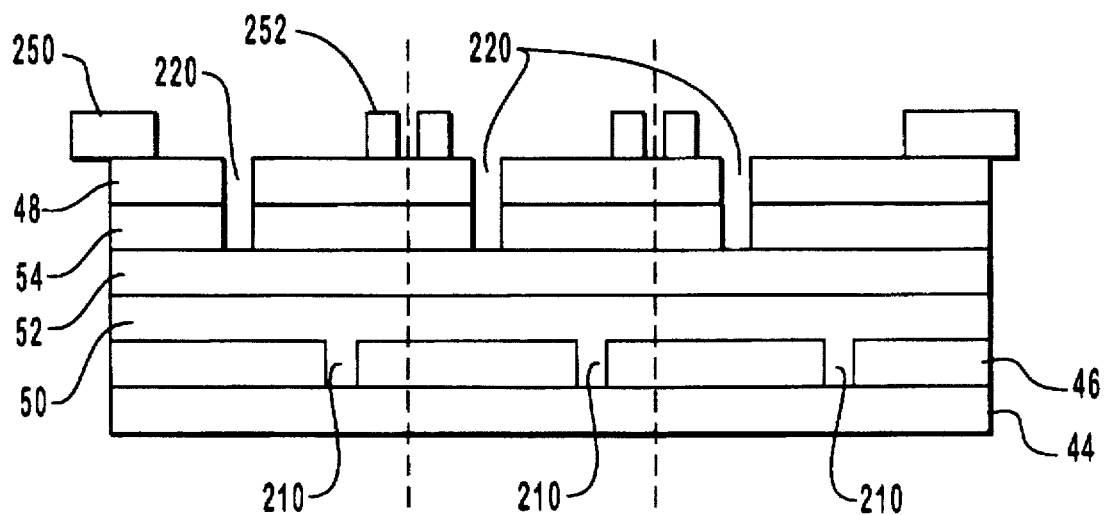
FIG. 6 illustrates a cross-sectional view of a manufacturing construct 200 having a first region of electrical isolation 210 and a second region of isolation 220 formed therein.

Now referring to FIGS. 5 and 6, a manufacturing construct 200, similar to the plurality of electrochromic devices discussed above, comprises a first electrical conducting layer 46 on the substrate 44 and the second electrical conducting layer 48 at the opposite end of the manufacturing construct. An electrochromic stack (layers 50, 52, 54), is sandwiched between the electrical conducting layers. A first pattern of electrical isolation 210 separating the first electrical conducting layer into a plurality of electrically partitioned regions is formed, and a second pattern of isolation 220, separating at least the second electrical conducting layer 48 into a plurality of separate regions of isolation, is formed using laser ablation following stack deposition. As with individual electrochromic devices, depending on the depth of the delineation, the second region of isolation can be a region of electrical or electrical and ionic isolation. In the manufacturing construct, the first pattern of isolation and the second pattern of isolation intersect to form a plurality of electrochromically active areas which are thereafter separated into a plurality of individual electrochromic devices 230. Voltage means 250 and 252 provide a means for providing voltage across each individual electrochromic device. The electrochromic devices can be separated into individual electrochromic devices by any suitable means, such as scribing and breaking or sawing.

It will be understood that a substrate used to form a manufacturing construct is typically larger than the substrates used for the individual electrochromic devices. In addition, as with the laser patterning of the individual electrochromic devices, the geometry of the electrochromically active area can be tailored to the specific uses of the electrochromic device.

Here again, as with the process for forming individual electrochromic devices discussed above, layers 46, 48, 50, 52, and 54 can be formed using any suitable method, including, but not limited to spreading, sintering, evaporating, sputtering, or other similar techniques, but are preferably formed using vapor disposition techniques. As with individual electrochromic devices, all of the layers above the first electrical conducting layer can be formed using vacuum deposition without breaking the vacuum, thus providing an efficient method of mass-producing electrochromic devices. Additionally, with in vacuo laser patterning of the first electrical inductive layer, the entire electrochromic device can be deposited in a single vacuum cycle, thereby providing an even more efficient method of mass production.

Figure 7:
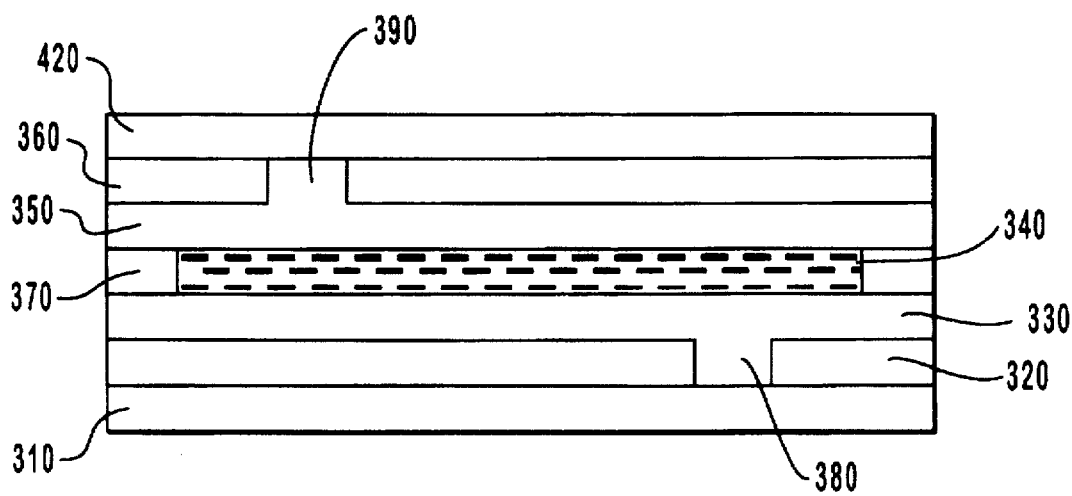
FIG. 7 illustrates a cross-sectional view of a electrochromic device having a polymer electrolyte ion conducting layer.

In another embodiment of the current invention, as illustrated in FIG. 7, the electrochromic device can be formed as two half cells and joined together to form an electrochromic device having a polymer electrolyte ion conducting layer. Accordingly, an electrochromic device having a polymer electrolyte ion conducting layer 340, is prepared by forming a first electrical conducting layer 320 on a substrate 310 and laser patterning a first region of electrical isolation 380 partitioning the first electrical conducting layer into at least two electrically separate areas. A second layer 330 being either a ion storage layer or an electrochromic layer is formed on the first electrical conducting layer 320, to form a first substrate assembly 400.

A second electrical conducting layer 360 is then formed on a second substrate 420 and is laser patterned to form a second region of isolation 390 separating the second electrical conducting layer into at least two electrically separate areas. A layer 350 being either an electrochromic layer or an ion storage layer is then formed on the second electrical layer 360 to form a second substrate assembly. Here again, whether an electrochromic layer or an ion storage layer is formed is dependent upon whether the first substrate assembly comprises an electrochromic layer or an ion storage layer. If the first substrate assembly comprises an electrochromic layer, layer 350 can be either an electrochromic layer or an ion storage layer, whereas if layer 330 is an ion storage layer, layer 350 is an electrochromic layer.

The two assemblies are then positioned so that said first substrate assembly and the second substrate assembly are in an electrode-facing relationship. The two assemblies are then joined by a spacer means 370 so that a space is formed between the assemblies. An electrolyte 340 is introduced into the space defined between the two assemblies and the spacer means, so that electrolyte 340 is retained in the space. The first region of electrical isolation 380 and the second region of isolation 390 intersect to define at least one electrochromically active area.

Several types of electrochromic materials are known, including metal oxides and electrically conductive polymers. Exemplary of the metal oxides are niobium oxide $Nb_2O_5$; nickel oxide $NiO$; iridium oxide $IrO_2$; vanadium pentoxide $V_2O_5$; rhodium oxide $Rh_2O_3$; and molybdenum trioxide $MoO_3$; and preferably tungsten oxide $WO_3$. Conductive polymers include polyaniline, polyacetylene, polypyrrole, polythiophene, polyphenylene, polyphenylene vinylene, polyphenylene sulfide, polypheryl diamene, poly ($N,N^1$ dipherylbenzidine) and derivatives, copolymers and bilayers.

Suitable solid state ion conductor materials include $Ta_2O_5$, $ZrO_2$, $MgF_2$, $LiNbO_3$ and suitable polymer ion conductor materials include proton conducting polymers such as polyAMPS (2-acrylamido-2-methylpropanesulfonic acid) and $Li^+$ conducting polymer such as PMMA (poly methyl methacrylate) inferences doped with $LiClO_4$.

Suitable ion storage materials include, but are not limited to NiO, $IrO_2$ and $V_2O_5$. In a preferred embodiment the ion storage material is NiO.

Suitable electrical conducting layers include, but are not limited to ITO, $SnO_2$:F, ZnO, Al, Mo, Ni and Au. When the electrochromic device is transparent, the electrical conducting layer is preferably an ITO layer. Furthermore, when the electrochromic materials form a reflective device, the electrical conducting layer is preferably a reflecting metal such as Al, Au, Mo and Ni.

The substrate can be any suitable material such as plastic or glass. In addition, depending on its use, the substrate can be either transmissive if used in windows or glasses, or the substrate can be reflective if used in mirrors.

In a preferred embodiment of the invention, the electrochromic device uses a glass substrate; an indium tin oxide electrical conducting layer; a nickel oxide ion storage layer; a tantalum pentoxide ion conducting layer; and a tungsten oxide electrochromic layer.

EXAMPLE

Laser ablation processes within the scope of the present invention are further clarified by consideration of the following example, which is intended to be purely exemplary of the present invention and should not be viewed as a limitation on any claimed embodiment.

Figure 4A:
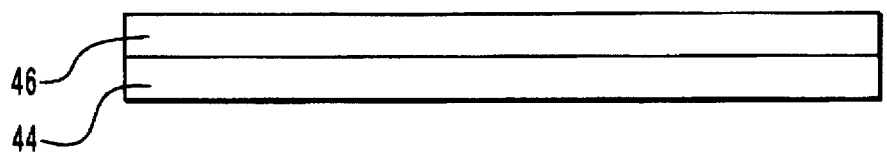
FIG. 4a illustrates a cross-sectional view of a substrate having an electrical conducting layer formed thereon.
Figure 4B:
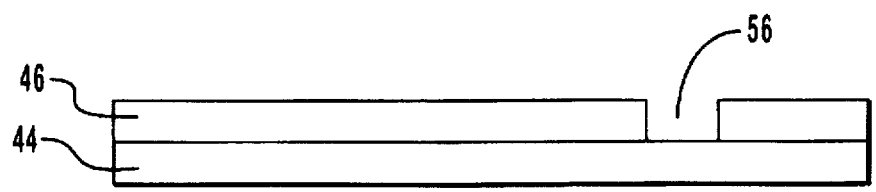
FIG. 4b illustrates a cross-sectional view of a substrate having an electrical conducting layer formed thereon with a first region of electrical isolation formed in the electrical conducting layer.
Figure 4C:
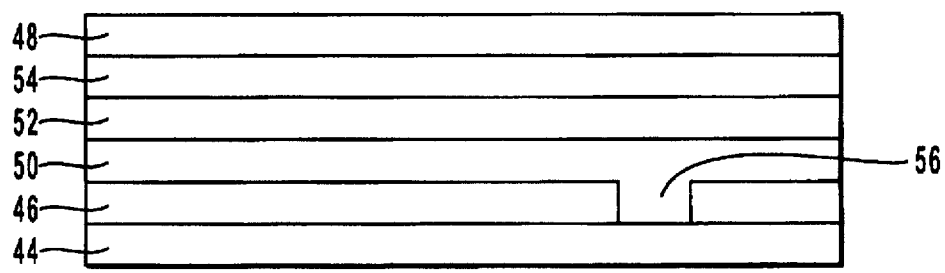
FIG. 4c illustrates a cross-sectional view of an electrochromic device having a first region of electrical isolation formed therein.
Figure 4D:
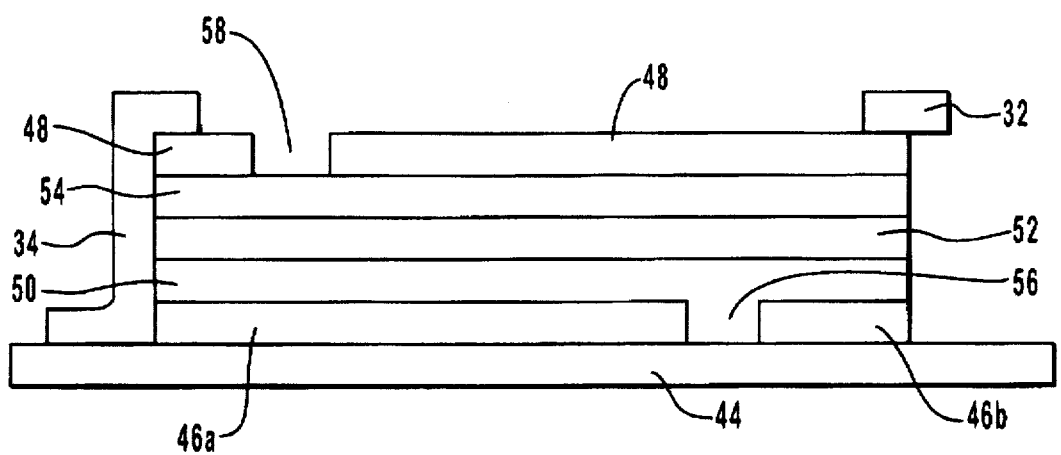
FIG. 4d illustrates a cross-sectional view of an electrochromic device having a first region of electrical isolation formed in the first electrical conducting layer and a second region of isolation formed in the second electrical conducting layer.
Figure 4E:
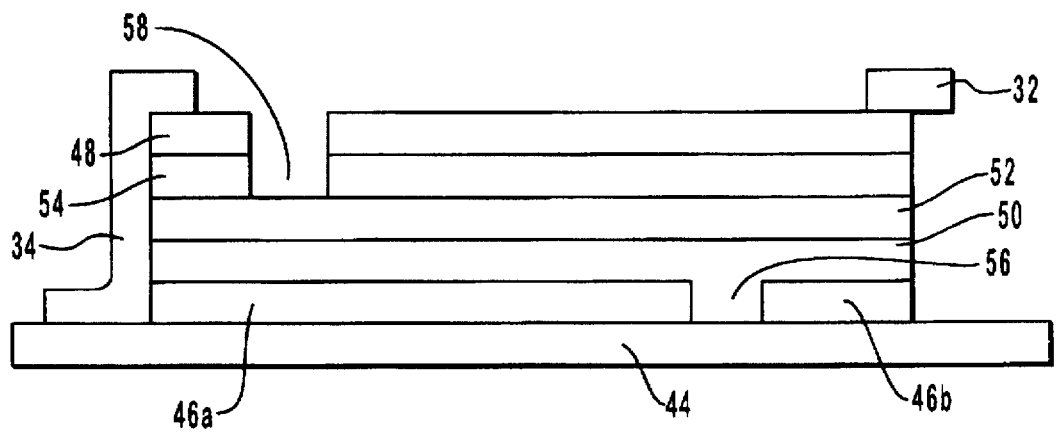
FIG. 4e illustrates a cross-sectional view of an electrochromic device having a first region of electrical isolation 56 formed in the first electrical conducting layer 46 and a second region of isolation 58 formed through the second electrical conducting layer 48 and the fourth layer 54 in electrochromic device 40.
Figure 4F:
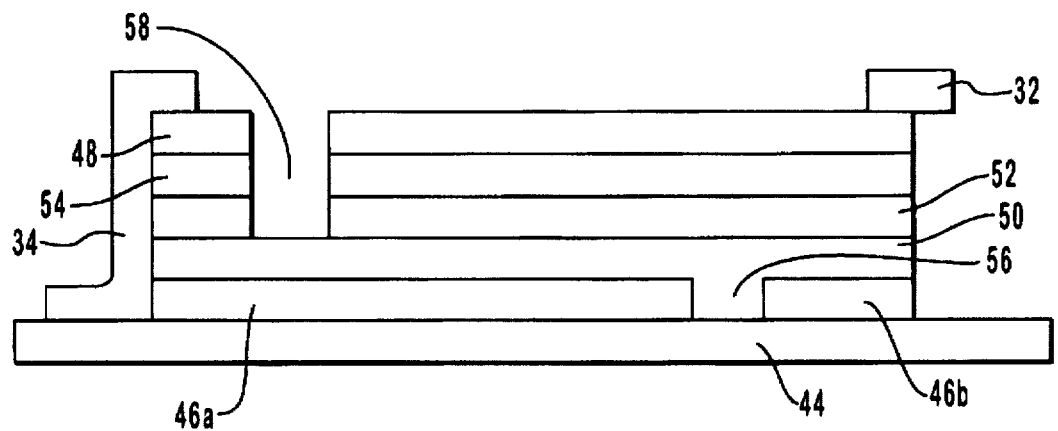
FIG. 4f illustrates a cross-sectional view of an electrochromic device having a first region of electrical isolation 56 formed in the electrical conducting layer 46 and a second region of isolation 58 formed through second electrical conducting layer 48, fourth layer 54 and third layer 52.
Figure 4G:
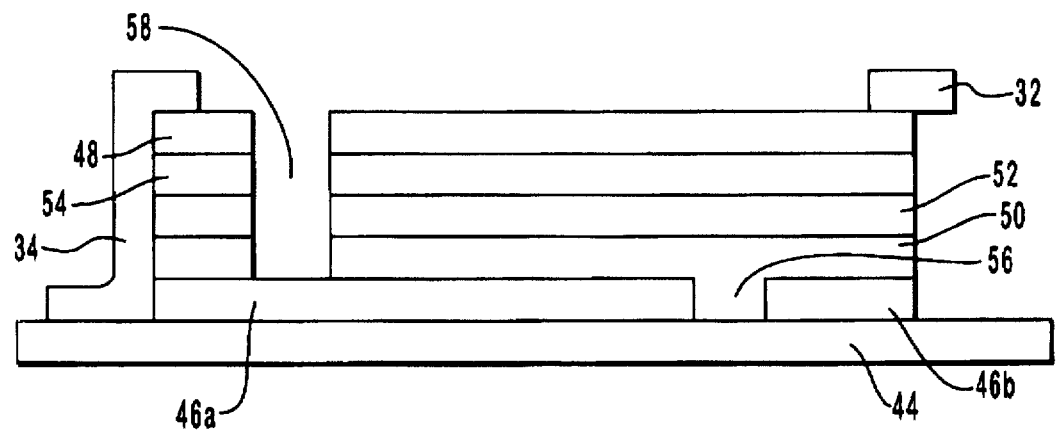
FIG. 4g illustrates a cross-sectional view of an electrochromic device having a first region of electrical isolation 56 formed in the electrical conducting layer 46 and a second region of isolation 58 extending through the second electrical conducting layer 48, further layer 54, third layer 52, and second layer 50.

An electrochromic device such as that shown in FIG. 4c can be delineated to controlled depths using laser ablation techniques. The number of pulses necessary to cut to a specific depth is dependent on a number of variables including, the wavelength of the laser used and the materials being delineated.

Figure 8:
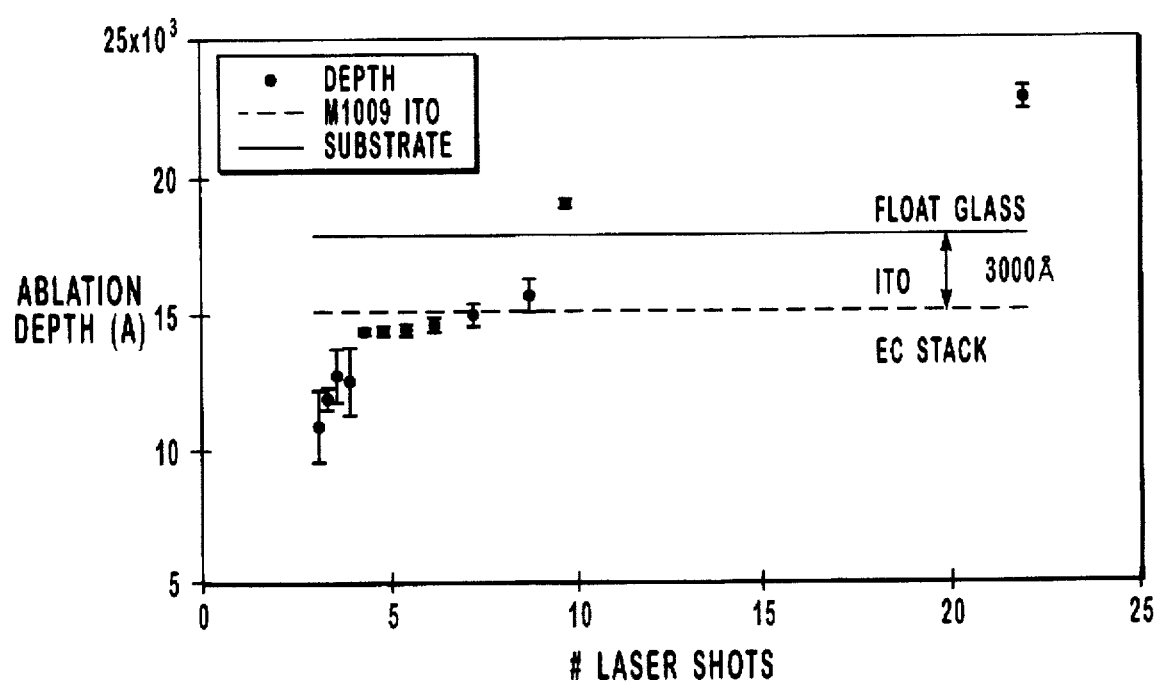
FIG. 8 is a graph illustrating the number of laser shots necessary to reach a certain ablation depth, using laser energy density of 2 Joules/cm$^2$, at a wavelength of 248 nm, and a first electrical conducting layer composed of indium tin oxide.

At an energy density of 2 $J/cm^2$ at a wavelength of 248 nm, a single shot was found to form a second region of isolation sufficiently deep in the electrochromic device to obtain isolated performance between individual electrochromically active areas with no evidence of cross-talk or bleeding between the areas. In order to ablate the electrochromic devices sufficiently for contact with the bottom first electrical conducting layer, approximately five pulses (also hereinafter referred to as shots) of the laser are necessary, at a 2 $J/cm^2$ laser energy density (as illustrated in FIG. 8).

It is readily understood by one of skill in the art that the shot energies and shot number can be varied without altering the layer systems ability to delineate the device to a controlled depth.

The present invention may be embodied in other specific forms without departing from its spirit or essential characteristics. The described embodiments are to be considered in all respects only as illustrated and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A method for preparing a device having at least one electrochromically active area capable of changing transmittance or reflectance in response to an applied voltage, said method comprising the steps of:

obtaining a substrate;

forming a first layer on said substrate, said first layer being an electrical conducting layer;

patterning a first region of electrical isolation partitioning said first electrical conducting layer into at least two electrically separate areas;

forming a second layer on said first electrical conducting layer, said second layer selected from the group consisting of an ion storage layer and an electrochromic layer;

forming a third layer on said second layer, said third layer being an ion conducting layer on said second layer;

forming a fourth layer on said ion conducting layer, said fourth layer being selected from the group consisting of an ion storage layer and an electrochromic layer; wherein said fourth layer is an ion storage layer or an electrochromic layer when the second layer is an electrochromic layer, and wherein said fourth layer is an electrochromic layer when the second layer is an ion storage layer;

forming a fifth layer on said fourth layer, said fifth layer being a second electrical conducting layer;

laser patterning a second region of isolation separating said second electrical conducting layer into at least two electrically separate areas in manner such that said first region of electrical isolation and said second region of electrical isolation intersect to define at least one electrochromically active area.

2. A method for preparing a device having at least one electrochromically active area capable of changing transmittance or reflectance in response to an applied voltage as recited in claim 1, wherein said second layer, said third layer, said fourth layer and said fifth layer are formed using physical vapor deposition.

3. A method for preparing a device having at least one electrochromically active area capable of changing transmittance or reflectance in response to an applied voltage as recited in claim 1, wherein said second layer, said third layer, said fourth layer and said fifth layer are formed using physical vapor deposition in one vacuum cycle.

4. A method for preparing a device having at least one electrochromically active area capable of changing transmittance or reflectance in response to an applied voltage as recited in claim 1, wherein said device is formed in a single vacuum cycle.

5. A method for preparing a device having at least one electrochromically active area capable of changing transmittance or reflectance in response to an applied voltage as recited in claim 1, further comprising providing means for applying a voltage on said electrochromic device.

6. A method for preparing a device having at least one electrochromically active area capable of changing transmittance or reflectance in response to an applied voltage as recited in claim 1, wherein said second region of isolation separating said electrical conducting layer into at least two electrically separate areas, further extends into said fourth layer separating said fourth layer into at least two ionically separate areas.

7. A method for preparing a device having at least one electrochromically active area capable of changing transmittance or reflectance in response to an applied voltage as recited in claim 1, wherein said second region of isolation separating said electrical conducting layer into at least two electrically separate areas, further extends into said third layer separating said third layer into at least two ionically separate areas.

8. A method for preparing a device having at least one electrochromically active area capable of changing transmittance or reflectance in response to an applied voltage as recited in claim 1, wherein said second region of isolation partitioning said electrical conducting layer into at least two electrically separate areas, further extends into said second layer separating said second layer into at least two regions of ionically separate areas.

9. A method for preparing a device having at least one electrochromically active area capable of changing transmittance or reflectance in response to an applied voltage as recited in claim 1, wherein said first region of electrical isolation and said second region of isolation intersect to define a plurality of electrochromically active areas.

10. A method for preparing a device having at least one electrochromically active area capable of changing transmittance or reflectance in response to an applied voltage as recited in claim 9, wherein providing each of said plurality of electrochromic areas with means for applying voltage, so that said electrochromically active area changes transmittance or reflectance in response to an applied voltage.

11. A method for preparing a device having at least one electrochromically active area capable of changing transmission in response to an applied voltage as recited in claim 1, further comprising separating said plurality of said electrochromically actives areas into a plurality of individual electrochromically active devices.

12. A method for preparing a device having at least one electrochromically active area capable of changing transmittance or reflectance in response to an applied voltage as recited in claim 1, wherein said substrate is glass, said first layer is indium tin oxide, said second layer is nickel oxide, said third layer is tantalum pentoxide, said fourth layer is tungsten oxide, and said fifth layer is indium tin oxide.

13. A method for preparing a device having at least one electrochromically active area capable of changing transmittance or reflectance in response to an applied voltage as recited in claim 1, wherein said substrate is glass, said first layer is indium tin oxide, said second layer is tungsten oxide, said third layer is tantalum pentoxide, said fourth layer is nickel oxide, and said fifth layer is indium tin oxide.

14. A method for preparing a device having at least one electrochromically active area capable of changing transmittance or reflectance in response to an applied voltage, said method comprising the steps of:

obtaining a first substrate;

forming a first layer on said first substrate, said first layer being a first electrical conducting layer;

laser patterning a first region of electrical isolation partitioning said first electrical conducting layer into at least two electrically separate areas;

forming a second layer on said first electrical conducting layer, said second layer selected from the group consisting of an ion storage layer and an electrochromic layer to form a first substrate assembly;

obtaining a second substrate;

forming a fifth layer on said second substrate, said fifth layer being a second electrical conducting layer;

laser patterning a second region of isolation partitioning said second electrical conducting layer into at least two electrically separate areas;

forming a fourth layer on said second electrical conducting layer, said fourth layer being selected from the group consisting of an ion storage layer and an electrochromic layer; wherein said fourth layer is an ion storage layer or an electrochromic layer when the second layer is an electrochromic layer, and wherein said fourth layer is an electrochromic layer when the second layer is an ion storage layer to form a second substrate assembly;

positioning said first substrate assembly and said second substrate assembly in an electrode facing relationship and joining the assemblies by spacer means so that a space is formed between said assemblies, introducing electrolyte into said space defined between said assemblies and said spacer means so that said electrolyte is retained in said space.

15. A method for preparing a device having at least one electrochromically active area capable of changing transmittance or reflectance in response to an applied voltage as recited in claim 14, further comprising providing means for applying a voltage on said electrochromic device.

16. A method for preparing a device having at least one electrochromically active area capable of changing transmittance or reflectance in response to an applied voltage as recited in claim 14, wherein said second pattern of isolation extends into said fourth layer separating said fourth layer into at least two ionically separate areas.

17. A method for preparing a device having at least one electrochromically active area capable of changing transmittance or reflectance in response to an applied voltage as recited in claim 14, wherein said first pattern of isolation extends into said second layer separating said fourth layer into at least two ionically separate areas.

18. A device having an electrochromically active area capable of changing transmittance or reflectance in response to an applied voltage, said device comprising:

a substrate;

a first layer on said substrate, said first layer being a first electrical conducting layer;

a second layer on said first electrical conducting layer, said second layer being selected from the group consisting of an ion storage layer and an electrochromic layer;

a third layer on said second layer, said third layer being an ion conducting layer;

a fourth layer on said ion conducting layer, said fourth layer being selected from the group consisting of an ion storage layer and an electrochromic layer; wherein said fourth layer is an ion storage layer or an electrochromic layer when the second layer is an electrochromic layer, and wherein said fourth layer is an electrochromic layer when the second layer is an ion storage layer;

a fifth layer on said fourth layer, said fifth layer being a second electrical conducting layer;

a first region of electrical isolation formed partitioning said first electrical conducting layer into two electrically separate regions;

a second region of isolation formed by laser ablation separating said second electrical conducting layer into two electrically separate regions, wherein said second region of electrical isolation intersects said first region of electrical isolation in a manner which forms an electrochromically active area.

19. A device having at least one electrochromically active area capable of changing transmittance or reflectance in response to an applied voltage as recited in claim 18, wherein said second region of isolation separating said electrical conducting layer into at least two electrically partitioning areas, further extends into said fourth layer separating said fourth layer into at least two ionically separate areas.

20. A device having at least one electrochromically active area capable of changing transmittance or reflectance in response to an applied voltage as recited in claim 18, wherein said second region of isolation partitioning said electrical conducting layer into at least two electrically separate areas, further extends into said third layer separating said third layer into at least two ionically separate areas.

21. A device having at least one electrochromically active area capable of changing transmittance or reflectance in response to an applied voltage as recited in claim 18, wherein said second region of isolation partitioning said electrical conducting layer into at least two electrically separate areas, further extends into said second layer separating said second layer into at least two ionically separate areas.

22. A device having at least one electrochromically active area capable of changing transmittance or reflectance in response to an applied voltage as recited in claim 18, wherein said substrate is reflective.

23. A device having at least one electrochromically active area capable of changing transmittance or reflectance in response to an applied voltage as recited in claim 18, wherein said substrate is transmissive.

24. A device having at least one electrochromically active area capable of changing transmittance or reflectance in response to an applied voltage as recited in claim 18, wherein said substrate is glass, said first layer is indium tin oxide, said second layer is nickel oxide, said third layer is tantalum pentoxide, said fourth layer is tungsten oxide, and said fifth layer is indium tin oxide.

25. A device having at least one electrochromically active area capable of changing transmittance or reflectance in response to an applied voltage as recited in claim 18, further comprising means for applying voltage to said electrochromic device wherein said means connected for applying voltage is to said second electrical conducing layer.

26. A device having at least one electrochromically active area capable of changing transmittance or reflectance in response to an applied voltage as recited in claim 18, further comprising a second substrate on said second electrical conducting layer.

27. A manufacturing construct having a plurality of electrochromic devices arranged on a single substrate in a manner suitable for separation into individual electrochromic devices, each of said electrochromic devices having at least one electrochromically active area that changes transmittance or reflectance in response to an applied voltage, said manufacturing construct comprising:

a substrate large enough to support a plurality of electrochromic devices;

a first layer formed on said substrate, said first layer being a first electrical conducting layer;

a second layer on said first electrical conducting layer, said second layer selected from the group consisting of an ion storage layer and an electrochromic layer;

a third layer on said second layer, said third layer being an ion conducting layer;

a fourth layer on said ion conducting layer, said fourth layer being selected from the group consisting of an ion storage layer and an electrochromic layer; wherein said fourth layer is an ion storage layer or an electrochromic layer when the second layer is an electrochromic layer, and wherein said fourth layer is an electrochromic layer when the second layer is an ion storage layer;

a fifth layer on said fourth layer, said fifth layer being a second electrical conducting layer;

a first pattern of electrical isolation partitioning said first electrical conducting layer into a plurality of electrically separate regions;

a second pattern of isolation partitioning said second electrical conducting layer into a plurality of electrically separate regions wherein said first pattern of electrical isolation and said second pattern of electrical isolation intersect in a manner which form a plurality of electrochromically active areas which may thereafter be separated into a plurality of individual electrochromically active devices.

28. A manufacturing construct having a plurality of electrochromically active devices arranged on a single substrate, each of said electrochromically active area having at least one electrochromically active area capable of changing transmittance or reflectance in response to an applied voltage as recited in claim 25, wherein said substrate is glass, said first layer is indium tin oxide, said second layer is nickel oxide, said third layer is tantalum pentoxide, said fourth layer is tungsten oxide, and said fifth layer is indium tin oxide.

29. A manufacturing construct having a plurality of electrochromically active devices arranged on a single substrate, each of said electrochromically active area having at least one electrochromically active area capable of changing transmittance or reflectance in response to an applied voltage as recited in claim 25, further comprising means for applying voltage to each of said plurality of electrochromic devices.

30. A manufacturing construct having a plurality of electrochromically active devices arranged on a single substrate, each of said electrochromically active area having at least one electrochromically active area capable of changing transmittance or reflectance in response to an applied voltage as recited in claim 25, wherein said first pattern and said second pattern are formed by laser patterning.

31. A manufacturing construct having a plurality of electrochromically active devices arranged on a single substrate, each of said electrochromically active area having at least one electrochromically active area capable of changing transmittance or reflectance in response to an applied voltage as recited in claim 25, further comprising a second substrate on said electrical conducting layer.

\* \* \* \* \*